United States Patent [19]

Clausen et al.

[11] 4,394,206

[45] Jul. 19, 1983

[54] APPARATUS AND METHOD FOR APPLYING AN ELONGATED TAB TO A MOVING SUBSTRATE

[75] Inventors: Victor H. Clausen; Charles E. Asbury, both of Vancouver, Wash.

[73] Assignee: H. B. Fuller Company, Saint Paul, Minn.

[21] Appl. No.: 331,647

[22] Filed: Dec. 17, 1981

[51] Int. Cl.[3] ........................ B32B 31/10; B65D 65/34

[52] U.S. Cl. ...................................... 156/322; 53/412; 156/166; 156/324; 156/499; 156/522; 156/543; 156/555; 206/605; 206/616; 226/3; 226/21; 493/930; 493/963

[58] Field of Search .................. 53/412; 156/322, 324, 156/499, 521, 522, 543, DIG. 21, 166, 176, 555; 206/605, 616; 226/21, 3; 493/930, 963

[56] References Cited

U.S. PATENT DOCUMENTS 3,555,764 1/1971 Dowling .............................. 53/412

3,660,200 5/1972 Anderson et al. .............. 156/322 X 3,694,927 10/1972 Sorenson ........................ 156/322 X 3,912,143 10/1975 Miller et al. ...................... 226/21 X

*Primary Examiner*—Robert A. Dawson

*Attorney, Agent, or Firm*—Merchant & Gould

[57] ABSTRACT

An applicator (10) for applying a string or tape (72) coated with a thermoplastic adhesive to a moving substrate (14) is the subject of this patent application. The applicator (10) includes a first roll (28) about which the string (72) is fed. Thereafter, the string (72) is led over a second roll (30). The string (72) is, successively looped about both of the rolls (28, 30) a number of times. One of the rolls (28) is heated by use of a plurality of heating elements (26) embedded in a casting (24) surrounding the roll (28). The second roll (30) is pivotable about an axis and in a plane generally parallel to an axis of elongation of the first roll (28). Loops of the string (72) can, thereby, be spaced axially along the rolls (28).

12 Claims, 7 Drawing Figures

APPARATUS AND METHOD FOR APPLYING AN ELONGATED TAB TO A MOVING SUBSTRATE

TECHNICAL FIELD

The invention of the present application broadly deals with packaging for bulk commodities such as soaps and detergents. More narrowly, however, the invention is directed to the application of a tab, by which a subsequently formed package can be opened, to a moving board or kraft paper substrate used in forming the packaging. In a preferred embodiment, the invention is directed to an apparatus for applying a thermoplastic adhesive impregnated, elongated tab to the moving substrate.

BACKGROUND OF THE INVENTION

Various products commercially available are sold in large capacity, board or kraft paper packaging typically characterized as an "economy size" packaging. Illustrative of these types of products are soaps, detergents, etc.

Although smaller packagings have portions thereof which are perforated so as to be able to have the perforated portion pushed inward in order to create a discharge aperture, larger capacity packagings commonly are opened by drawing a tear tab along at least a portion of the periphery of the packaging box in order to, for example, provide a hinged lid providing access to the contents carried therein.

Such larger capacity packagings are typically made from folding carton board stock or heavy kraft paper. The board stock or paper is run over rollers or between nips formed between pairs of rollers in an "in-machine" direction. As the board stock or kraft paper passes a particular position, apparatus at the position feeds a tab string or tape material from a spool onto the moving substrate. The tab material is impregnated with a thermoplastic adhesive which, prior to the tab being applied to the moving substrate, is heated to a temperature at which it will become soft enough so that, when it is brought into engagement with the substrate, it will wet-out sufficiently to allow bonding of the tab to the substrate.

Various devices in the prior art have utilized heated rolls or wheels to effectuate the heating, and consequent softening, of the adhesive impregnating the tab. U.S. Pat. No. 3,617,422 issued to John Rene Paulson on Nov. 2, 1971 illustrates one particular hot wheel applicator.

Structures of this type, however, have a number of inherent problems. A significant limitation upon the productivity of a facility manufacturing packaging as previously described is the speed at which the web substrate moves. The speed of the substrate is, however, limited by the speed at which the tab can be fed into engagement therewith and, in turn, the speed at which the thermoplastic adhesive can be brought to a desired temperature at which the tab can be satisfactorily bonded to the substrate. The governing manufacturing limitation, therefore, becomes the speed at which the adhesive is brought to its application temperature.

In conducting manufacturing operations, the web substrate can be made to travel at speeds between 500 feet per minute and 1000 feet per minute. If a heating wheel such as that illustrated in the Paulson patent were used to heat the adhesive prior to applying the tab to a substrate moving this fast, the adhesive could not be brought to a sufficiently high temperature in order to form a satisfactory bond between the tab and the substrate.

The case is similar with other wheel and roll type heating applicators. One type of applicator commercially available utilizes a heating roll having a diameter of 16 inches. When such a roll is utilized to apply a tab to a substrate moving at 500 feet per minute, a particular segment of the tab is in engagement with, and absorbing heat from, the roll for a maximum of approximately 0.4 seconds. This time period is inadequate to wet-out most adhesives available for this application in order that a satisfactory bond be formed.

In reviewing the Paulson patent, one notices that, with that structure, the adhesive which is being heated is in engagement with the heating roll about only 75 to 80% of the circumference of the roll. The period of time during which the adhesive is heated, or dwell time, as it is referred to, can be increased by causing the adhesive to engage the heating roll so that a larger percentage of the circumferential surface of the roll will provide heat to the adhesive. Because of the engagement of the heated roll by the moving substrate, however, 80% of the circumferential surface is the approximate practical limit which can be made to be engaged by the adhesive.

Another possible solution to the problem is increasing the size of the heating roll in order to increase dwell time. This solution, however, also proves to be impractical. The 16 inch diameter wheel currently used in some structures is approaching the maximum size which can practicably be used, and, because of space limitations, use of a larger wheel would frequently be precluded.

Since the heat which is transmitted from the heated wheel to the impregnated tab is proportional to the temperature differential which exists between the wheel and the adhesive, one other possible solution is suggested. This solution would increase the temperature of the wheel to a level above that to which the adhesive is desired to be heated. Consequently, the adhesive would be provided with sufficient heat in order to insure adequate bonding even if the dwell time were as little as 0.4 seconds.

This solution, however, presents its own problems. Non-uniform bonding would be effected should the speed of the substrate in the "in-machine" direction be varied. Even more significantly, if movement of the substrate is terminated, the tab might become overheated. Where a tab having a thermoplastic core such as polyester is used, not only might the adhesive be melted, but the core also might be melted to the point where the tab breaks.

A further reason why it is not desirable to heat the wheel above the temperature to which the adhesive should be heated is the consequent reduction in service life of the equipment because of the higher operating temperatures. With such elevated temperatures, the equipment is subject to a shorter life. For these reasons, therefore, elevating the heating element to a temperature no higher than that to which the adhesive is desired to be raised is considered desirable.

It is to these problems and shortcomings in the prior art that the invention of the present application is directed. It provides a structure by which a tab, to be applied to a moving web substrate, can be heated sufficiently in order to insure adequate bonding to the substrate, but without overheating the tab to a point at which it will break. Additionally, it allows the tab to be heated uniformly along its length regardless of the speed at which the substrate is made to move in an "in-machine" direction.

SUMMARY OF THE INVENTION

The invention of the present application is a method for applying an elongated tab such as a string or tape to a moving web. The string or tape is coated with a thermoplastic adhesive, and it is an object of the method to bring the temperature of the adhesive to a point so that it becomes sufficiently pliant whereby, when the tab is applied to the moving web, satisfactory bonding of the tab to the web will be accomplished. In addition to a primary heating roll, a second roll having an axis spaced from the rotational axis of the heating roll is provided. The elongated, flexible tab is fed from a storage position, such as one in which it is wound on a spool, partially about the primary heating roll and, thereafter, around the second roll. The flexible tab member is successively looped about both of the rolls with each of the loops extending about both rolls.

The method can include a step of pivoting the second roll in a plane generally parallel to the axis of the primary heating roll and to positions at which the axes are out of parallel alignment. By so pivoting the second roll, the loops of the tab will be spaced from one another along the axes of the rolls.

The invention also includes a device for effectuating the method. The device includes a first elongated element, or roll, which is disposed for rotation about its axis of elongation. A second element, or roll, which is at least partially axially coextensive with the first element is provided. The second element is configured for pivoting, which pivoting defines a plane generally parallel to the axis of the first roll. When viewing the plane from a direction generally transverse to the orientation of the plane, the pivoting of the second element causes the variation of size of an angle formed between the axes of the two elements or rolls. At least one of the rolls, preferably that which is not pivotally mounted, is heated to a temperature to which it is desired to raise the thermoplastic adhesive which impregnates the tab. The tab is successively looped about both of the rolls to absorb heat from the heated roll as it passes thereabout and to promote equalization of the temperature of the adhesive throughout the total adhesive impregnation as the tab passes between rolls.

A preferred embodiment can include a third roll which is disposed for rotation about an axis of elongation generally parallel to the axis of the first roll. The third roll has an outer peripheral surface which is frictionally engaged by the moving web substrate. Transmission means can be provided to translate the rotational motion imparted to the third roll by the web, to the first roll. The transmission means can include appropriate gears, sprocket wheels, and intermediate elements in order to allow the first roll to rotate, preferably in a direction opposite that in which the third roll rotates or, if desired, in a consistent direction.

The first roll can be supported in a cantilever fashion from a gear box which houses the various gears, sprocket wheels, etc. which accomplish the transmission of the rotational motion from the third roll to the first roll. An end of the first roll which is supported within the gear box can have an annular groove formed therein and about the axis of rotation of the roll. A temperature sensing probe can extend into the groove to sense the temperature to which the roll is being heated. The probe can transmit the information sensed to a controller which regulates a plurality of heating elements surrounding the roll. If the roll is not being sufficiently heated in order to raise the thermoplastic adhesive to a satisfactory bonding temperature, the controller will be actuated to increase the temperature of the heating elements providing thermal energy to the roll.

Conversely, if the temperature of the roll is too high, the controller will be actuated to decrease the temperature to which the roll is heated by the heating elements. Consequently, overheating of the adhesive and/or a possible breaking of the tab is precluded.

The invention is thus an improved method and device for applying a thermoplastic impregnated tab to a moving web substrate in order to achieve a more satisfactory bonding of the tab to the substrate. More specific features of the invention and advantages obtained in view of those features will become more apparent with reference to the detailed description of the invention, claims, and appended drawings.

DETAILED DESCRIPTION OF THE INVENTION

Figure 2:
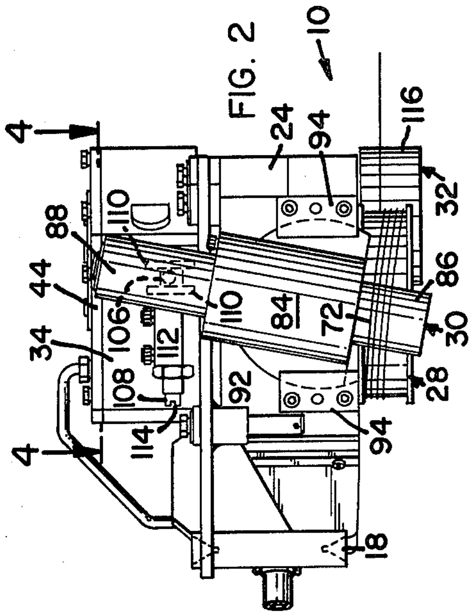
FIG. 2 is a view taken generally along the line 2—2 of FIG. 1.
Figure 1:
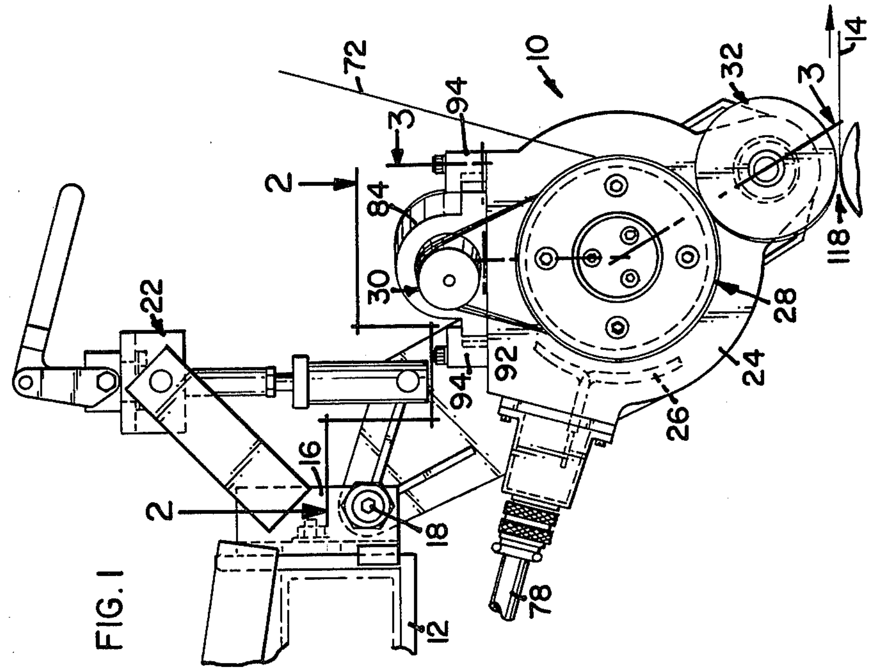
FIG. 1 is a side elevational view of the applicator of the present invention.
Figure 3:
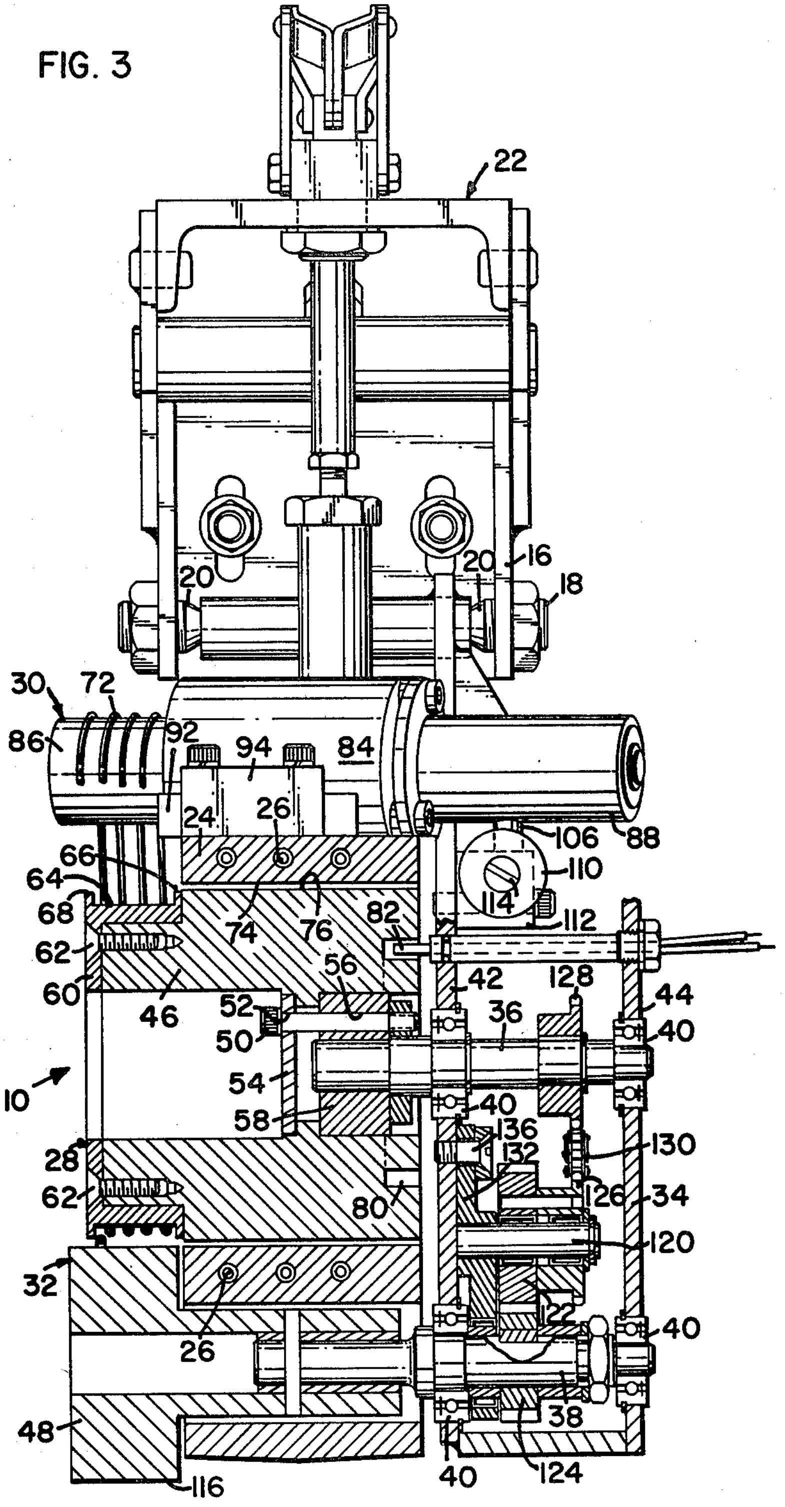
FIG. 3 is a view taken generally along the line 3—3 of FIG. 1.

Referring now to the drawings wherein like reference numerals denote like elements throughout the several views, a preferred embodiment of the invention and an alternative structure for a drum portion of a heated roll in an applicator constructed in accordance with the invention are illustrated. Referring to FIGS. 1, 2, and 3, and particularly to FIG. 3, a preferred embodiment of an applicator 10 in accordance with the present invention is shown as being mounted to a structural support beam 12 fixedly positioned at a location relative to the passage of a moving web substrate 14 such as board stock or kraft paper. The applicator 10 is attached to the structural support beam 12 by a clamp bracket 16. The operating structure of the applicator is carried by the bracket 16 and is pivotally mounted as at 18 to pivot about a pair of cone shaped bearings 20. A toggle clamp mechanism 22 is provided to move the applicator 10, selectively, into, and out of, engagement with the moving web substrate 14.

The operating portions of the applicator 10 include an aluminum casting 24 having a plurality of heating elements 26 cast integrally therewith, a first roll 28, enclosed by the casting 24, a second roll 30 mounted atop the casting 24, a third roll 32, and a gear box 34. The first and third rolls 28, 32 are fixedly attached to ends of axels 36, 38 extending in a cantilever fashion from the gear box 34. The axels 36, 38 are supported by bearings 40 at respective sidewalls 42, 44 of the gear box 34. The axels 36, 38 have hollow shafts which are designed to minimize the transfer of heat from heated drum portions 46, 48 of the rolls 28, 32 to the bearings 40.

Figure 5:
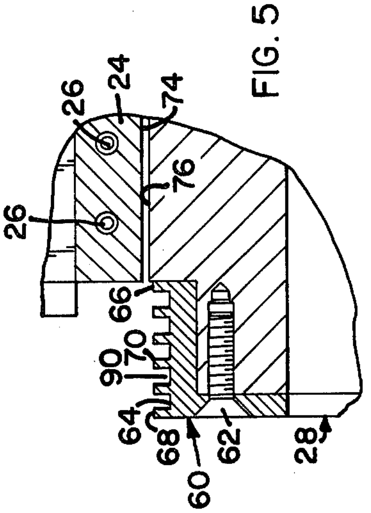
FIG. 5 is an enlarged fragmentary view, similar to a portion of the structure illustrated in FIG. 3, illustrating an alternative embodiment of the heated roll.

The first roll 28 is keyed to the axel 36 with which it rotates by a pin 50 inserted through an aperture 52 formed in an inner hub portion 54 of the roll 28 and an aperture 56, in registration with the aperture 52 in the hub portion 54, in a sleeve 58 keyed to the axel 36. At its end opposite the gear box 34, the first roll carries a removeable annular collar 60. The collar is affixable to the drum portion 46 of the roll 28 by appropriate means such as screws 62. The collar 60 has a track 64 defined between axially spaced inner and outer flanges 66, 68. As shown in FIG. 3, the preferred embodiment of the apparatus 10 includes a track 64 which does not have any ribs formed thereon. As seen in FIG. 5, however, an alternative embodiment of the invention contemplates a track 64 having annular ribs 70 to assist in maintaining separation of loops of a flexible, elongated string or tape 72 having portions thereof extending about the first roll 28.

As best seen in FIG. 3, the aluminum casting 24 having the heating elements 26 embedded therein encircles the drum portion 46 of the first roll 28 and has an inner surface 74 closely spaced from an outer peripheral surface 76 of the roll 28. The heating elements 26 are controlled by a controller (not shown) through a cable 78. The controller can be a solid state electric controller having wires running through the cable 78 to the heating elements 26 in the casting 24.

The casting 24, roll drum 46, and collar 60 are all made of heat conductive material so that heat generated at the heating elements 26 will pass to the track surface of the collar 60.

The first roll 28 has, formed in an axial end thereof proximate the gear box 34, an annular groove 80. A temperature sensing probe 82 carried by the gear box 34 is mounted for extension into the groove 80. As the first roll 28 is made to rotate on its axel 36, the probe 82 will remain in the groove 80 regardless of the portion of the roll 28 positioned relative thereto.

The probe 82 senses the temperature to which the drum 46 is being heated by the heating elements 26. The probe 82, in turn, actuates the controller to adjust the amount of thermal energy which is generated by the heating elements 26. The string or tape 72 which is extended around the collar 60 of the first roll 28 is impregnated with a thermoplastic adhesive in order to effect bonding of the string or tape 72 to the moving web substrate 14 to which it is applied. It is the heat generated by the heating elements 26 and transferred to the collar 60 which softens the adhesive in order to effect bonding to the substrate 14. If the temperature to which the adhesive is heated is not sufficiently high, satisfactory bonding will not be accomplished. If, on the other hand, the temperature becomes too high, the adhesive might melt off, and, in cases where particular types of cores, such as thermoplastic polyester cores are used to carry the adhesive, the core may break, interrupting application operations. The controller, therefore, in response to the temperature sensed by the probe 82, causes the heating elements 26 to produce, essentially, a constant temperature.

A second roll 30 is surrounded by a roll housing 84 for rotation about an axis of elongation thereof. The roll 30 is shown as having a portion 86 extending from the housing 84 and above the first roll 28 so that the portion 86 is axially coextensive therewith. The roll 30 is supported in a cantilever fashion within a bearing sleeve 88 extending from housing 84 on a side opposite that from which portion 86 of roll 30 extends. A bearing (now shown) is held within the bearing sleeve 88, and roll 30 is supported by the bearing.

As best seen in FIG. 1, the string or tape 72 is fed downwardly from a storage spool or other similar structure (not shown) around a portion of the annular collar 60 of the first roll 28 and looped up over portion 86 of the second roll 30. The string or tape 72 is, thereafter, again fed about the first roll 28 and back over portion 86.

In the preferred embodiment of the invention, successive loops of the string 72 are spaced in an axial direction proceeding outwardly from the casting 24. In the embodiment shown in FIG. 5, a first loop would be seated in an innermost of the channels 90, the second in the second innermost channel 90, etc.

As illustrated in the figures, the remote end of the portion 86 of the second roll 30 does not have a flange as does the collar 60 of the first roll 28. Consequently, the second roll 30 extends axially beyond the collar 60 of the first roll 28, and axial movement of the loops is limited by the outer flange 68 of the first roll 28 alone. In one structure of the apparatus, the collar 60 of the first roll 28 has been given a dimension of two and one half inches, while the portion 86 of the second roll 30 which is axially coextensive with the collar 60 has been given a dimension of 2.87 inches. It will be understood, however, that these dimensions are not exclusive and are only those used in one particular structure. Dimensions may vary depending upon circumstances and particular applications.

Similarly, although the collar 60 illustrated in FIG. 5 is shown as having only five channels 90 formed therein, it will be understood that numbers of channels 90 in excess of five are specifically contemplated. In fact, in the preferred embodiment of the invention wherein ribs 70 are not provided in the track 64, the string 72 can be looped about the first and second rolls 28, 30 as many as approximately 10 times. It is understood, therefore, that, when such a number of loops are necessary, an embodiment as illustrated in FIG. 5 would provide a similar number of channels 90.

The second roll 30 is disposed for pivoting about a generally vertically extending axis and in a generally horizontal plane parallel to the axis about which the first roll 28 rotates. A circular base 92 of the roll housing 84 is rotatably held by a pair of shoes 94 mounted to casting 24 to accomplish this disposition. As seen in FIG. 2, the axis of rotation of the second roll 30 can be made to diverge from the axis of the first roll 28 so that the two axes, as viewed in a direction generally perpendicular to the plane defined by the axis of the second roll 30 as the second roll 30 pivots, form a variable sized angle therebetween. Typically, the angle of divergence of the axis of the second roll 30 will vary between 5° and 30° depending upon the number of loops of the string 72 about the rolls 28, 30.

Figure 6:
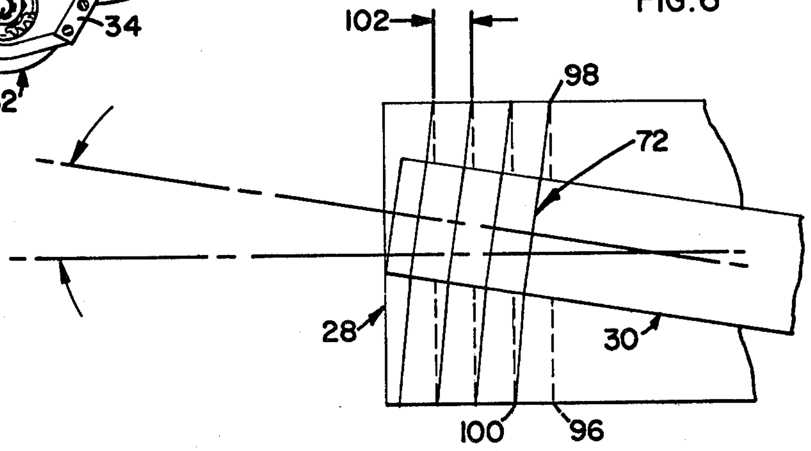
FIGS. 6 and 7 are exaggerated schematic views showing the heated roll and pivotally mounted roll in plan to illustrate the manner in which loops of the tab are spaced.
Figure 7:
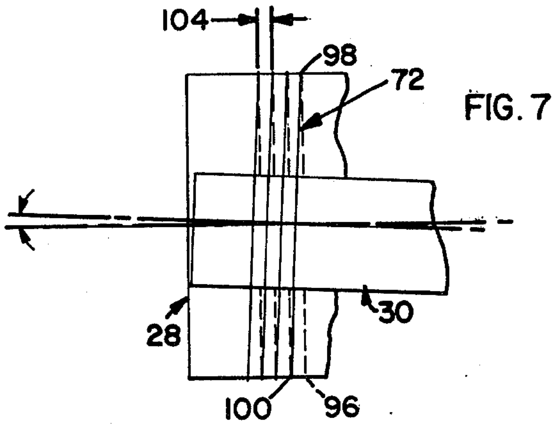

Referring now to FIGS. 6 and 7, and, first, FIG. 7, a small angle of divergence is illustrated schematically. The solid lines and dotted lines are used to illustrate the loops of the string 72 as they extend about the two rolls 28, 30. The string 72 engages the first roll 28 at a point indicated by the reference numeral 96 and passes beneath the first roll 28 in a plane generally transverse to the axis of the roll 28. Thereafter, as illustrated by the solid line emanating from the point identified by reference numeral 98, it will pass over the second roll 30 and will seek to position itself in a plane generally transverse to the axis of the second roll 30.

That portion of the run of a loop extending between points 98 and 100, that point at which the loop will re-engage first roll 28, which actually engages second roll 30 will, in fact, lie in a plane generally transverse to the axis of the second roll 30. Consequently, geometry dictates that that portion of the run of the loop extending between points 98 and 100 which is actually in engagement with second roll 30 will form an angle relative to the run of the loop extending between points 96 and 98 which is equal to the angle of divergence of the axis of second roll 30 from the axis of first roll 28.

Construction of a test structure, however, has revealed that that portion of the loop which is in engagement with neither the first roll 28 nor the second roll 30 will define a plane which is oblique with respect to the axes of both rolls 28, 30. As the string 72 departs from the surface of first roll 28 at point 98, it will diverge from the dotted line extending between points 96 and 98 at an angle somewhat smaller than the angle formed between the line indicating the portion of the loop in engagement with second roll 30 and the dotted line extending between points 96 and 98.

In any case, however, the point 100 at which the string 72 re-engages the first roll 28 will, therefore, be spaced axially outwardly from the point 96 at which it, in the immediately previous coil, engaged first roll 28. As can be seen, therefore, each successive loop will be spaced axially somewhat from the immediately previous loop, and the distance of spacing will be a function of the angle of divergence of the axis of the second roll 30 from that of the first roll 28.

Referring then to FIG. 6, the axes of the first and second rolls 28, 30 are shown with a greater angle of divergence. As can be seen, the distance 102 is greater than the distance 104 between loops in FIG. 7.

It will be understood, of course, that, although only four loops are shown in FIGS. 6 and 7, any number of loops are contemplated by the invention. As previously stated, in one particular application, approximately 10 loops of the string 72 are made about the rolls 28, 30. As will be apparent, however, the degree to which the second roll 30 can be pivoted and, consequently, the number of loops is limited by the axial length of the collar 60 of the first roll 28, assuming that the portion 86 of second roll 30 extends beyond the end of collar 60.

Figure 4:
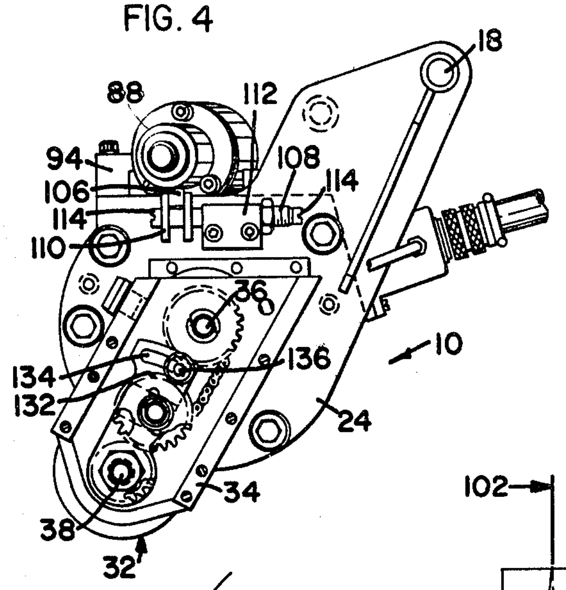
FIG. 4 is a view taken generally along the line 4—4 of FIG. 2.

As best seen in FIGS. 2 through 4, the bearing sleeve 88 of the second roll 30 has a downwardly extending boss 106. A threaded shank 108 having a pair of annular flanges 110 extending generally normal to the longitudinal axis of the shank 108 is disposed for longitudinal movement in a plane generally parallel to the plane defined by the pivoting of the second roll 30. The shank 108 is spaced at an appropriate distance from the second roll 30 so that the boss 106 is held between the flanges 110 of the shank 108. The shank 108 is threaded into an internally threaded bore formed in a member 112 attached to the casting 24. Either end of the shank 108 includes a slot 114 for screwdriver adjustment. As the shank 108 is moved longitudinally, the boss 106 will be carried by the flanges 110 and moved axially with respect to the shank 108. Since the boss 106 is spaced from the pivot point of the second roll 30, as it is urged axially with respect to the shank 108, the second roll 30 will be made to pivot.

If desired, appropriate indicia (not shown) can be provided on the casting 24 in order to indicate the degree of angling of the second roll 30 with the shank 108 in particular locations relative to the indicia.

Means can be provided for directing the string 72, after it has been looped successively a number of times about the first and second rolls 28, 30, into engagement with the moving substrate 14. A third roll 32 having an axis generally parallel to the axis of the first roll 28 and being closely proximate the first roll 28 can be utilized for this purpose. The third roll 32 is rigidly attached to an axel 38 rotatably supported by a pair of bearings 40, each supporting the axel 38 at one of the sidewalls 42, 44 of the gear box 34. Since a portion of the third roll 32 is closely proximate that portion of the casting 24 in which the heating elements 26 are embedded, this axel 38, as in the case of the axel 38 by which the first roll 28 is supported, can be hollow in order to minimize heat transmission to the bearings 40.

As best seen in FIGS. 1 and 3, the string 72, after its last loop about the first and second rolls 28, 30, can be fed about a portion of the outer peripheral surface 116 of the third roll 32 in a direction opposite that in which the coils of the string 72 are looped about the first and second rolls 28, 30. Thereafter, it can be drawn into a nip 118 formed between the third roll 32 and the moving substrate 14.

It will be observed that, since the third roll 32 is closely proximate a portion of the casting 24 in which the heating elements 26 are embedded, it will maintain the thermoplastic adhesive at the desired bonding temperature until the string 72 is actually applied to the substrate 14. In alternative structures, the third roll 32 can be provided with an independent heating source so that, if the temperature to which the substrate 14 can be actually subjected is less than that to which the adhesive is desired to be brought, heat can be applied to the adhesive until it is engaged with the substrate 14, but at a temperature lower than that provided by the first roll 28.

Since the outer peripheral surface 116 of the third roll 32 is frictionally engaged by the moving substrate 14, the third roll 32 will rotate at a speed commensurate with the speed at which the substrate 14 moves in an "in-machine" direction. If the string 72 were strong enough, it, theoretically, would function as a continuous belt to effect rotation of the first and second rolls 28, 30. In order, however, to reduce tensions on the string or tape 72, transmission means can be provided in order to effect rotation of the first roll 28 in response to rotation of the third roll 32. A jack shaft 120 can be disposed within the gear box 34 for rotation about an axis generally parallel to the axis of elongation of the axel 38 carrying the third roll 32. A gear 122 can be keyed to the jack shaft 120 and be in engagement with a similar gear 124 rigidly keyed to the axel 38 carrying the third roll 32. The jack shaft 120 will, thereby, be made to rotate in a direction opposite that in which the third roll 32 rotates.

Spaced axially on the jack shaft 120 from the gear 122 is a sprocket 126 wheel which is axially coextensive with a second sprocket wheel 128 mounted to the axel 36 supporting the first roll 28. These sprocket wheels 126, 128 are rigidly keyed to their respective shaft 120 and axel 36, as is true of the gears 122, 124 previously discussed. A continuous chain 130, compatible with the teeth of the sprocket wheels 126, 128 is made to extend about the wheels 126, 128. Since the wheels 126, 128 are rigidly keyed to their respective shaft 120 and axel 36, the rotation of the jack shaft 120 will be transmitted to the axel 36 supporting the first roll 28. This rotation of the first roll 28 will be in a direction similar to that of the jack shaft 120 and opposite that of the axel 38 supporting the third roll 32.

In FIG. 1, the substrate 14 is illustrated as moving from left to right with respect to the third roll 32. With such a movement, the third roll 32 is made to rotate in a counterclockwise direction. Because of the configuration of the first and second rolls 28, 30, it is desirable that they always rotate in a clockwise direction. With the particular gear and sprocket wheel configuration as previously discussed, however, the first and second rolls would be driven in a counterclockwise direction if the substrate were made to move from right to left as viewed in FIG. 1. A simple adaptation can be made if the applicator 10 is to be used with a substrate 14 moving thusly. The gear 124 keyed to the axel 38 supporting the third roll 32 can be removed and replaced with a sprocket wheel (not shown) made axially coextensive with the sprocket wheels 126, 128 on the jack shaft 120 and the axel 36 supporting the first roll 28. A longer chain can be made to extend about all three sprocket wheels so that the rotation of the third roll axel 38 is transmitted directly to the first wheel axel 36 and in a consistent direction. The sprocket wheel 126 keyed to the jack shaft 120, in such a configuration, would merely serve a tensioning function for the chain. As seen in FIGS. 3 and 4, a strut 132 supporting the jack shaft 120 can be mounted to the axel 38 supporting the third roll 32 and pivoted about the axis thereof. An arcuate slot 134 is provided in the end of the strut 134, and the slot 134 can be such that it is always in registration with a threaded bore provided in one of the sidewalls 42 of the gear box 34. A screw 136 can be tightened into the bore in order to hold the strut 132 in a desired orientation with respect to the bore. In an embodiment wherein rotational motion of the third roll 32 is transmitted directly to the first roll 28 by a chain, the chain can be tensioned by pivoting the strut 132 so that the jack shaft 120 is out of linear alignment with the axels 36, 38 of the first and third rolls 28, 32.

Although numerous characteristics, features, and advantages of the invention have been set forth in the foregoing description by utilizing specific structural examples, it will be understood that this disclosure is only illustrative. Changes may be made in details, particularly in matters of shape, size and arrangement of parts without exceeding the scope of the invention. The invention's scope is, of course, defined by the language in which the claims are expressed.

What is claimed is:

1. A device for raising the temperature of a thermoplastic adhesive, with which an elongated, flexible member is impregnated, prior to the member being applied to a moving web, in order to effect satisfactory bonding of the member to the web, comprising:

(a) a first element elongated with respect to a first axis and disposed for rotation about said axis;

(b) a second element elongated with respect to a second axis and disposed for rotation about said second axis, said second element being at least partially axially coextensive with said first element and configured for pivoting to define a plane generally parallel to said first axis so that said axes form an angle therebetween in said plane, wherein the size of said angle varies as said second element is pivoted; and (c) means for heating at least one of said elements at least to a temperature to which it is desired to raise the temperature of the thermoplastic adhesive;

(d) wherein the flexible member, prior to being applied to the moving web, is coiled successively about both of said elements so that, as said second element is pivoted so that the angle between said axes in said plane is increased in size, adjacent coils of the flexible member passing about said elements are spaced axially along said elements so that they do not engage one another.

2. A device in accordance with claim 1 wherein each of said elements is formed generally circularly cylindrically with respect to its respective axis.

3. A device in accordance with claim 1 wherein said heating means comprises:

(a) a heat conductive wall closely adjacent said at least one of said elements which is heated;

(b) a heating element carried by said wall; and (c) a controller for regulating said heating element.

4. A device in accordance with claim 3 wherein said at least one of said elements which is heated is formed circularly cylindrically with respect to its axis, and wherein said wall is annular, surrounding said circularly cylindrical element.

5. A device in accordance with claim 4 wherein said annular wall has a plurality of heating elements cast therein.

6. A device in accordance with claim 4 wherein said at least one of said elements which is heated has a supported axial end having an annular groove formed therein, said device further comprising a temperature sensing probe extending into said groove and means, responsive to the temperature sensed by said probe, for actuating said controller.

7. Apparatus for applying a thermoplastic-adhesive-impregnated, elongated, flexible member to a moving web, comprising:

(a) means for raising the temperature of the impregnating adhesive to a level at which it will satisfactorily bond the member to the web, said temperature raising means comprising:

(i) a first roll having an outer peripheral surface and an axis about which said first roll rotates;

(ii) a second roll having an outer peripheral surface and an axis about which said second roll rotates, said second roll being at least partially axially coextensive with said first roll, and said axis of said second roll being disposed for pivoting in a plane generally parallel to said axis of said first roll; and (iii) means for heating at least one of said rolls;

(iv) wherein the flexible member is coiled successively about said first and second rolls with each of said coils extending about both of said rolls; so that, as said second roll is pivoted so that its axis moves in said plane so that said axes define an increasingly sized angle in said plane, adjacent of said coils will become increasingly spaced from one another in order to prevent inadvertent engagement and bonding thereof; and (b) means for directing the flexible member, after being coiled about said rolls, into engagement with the moving web.

8. Apparatus in accordance with claim 7 wherein said directing means comprises a third roll disposed for rotation about an axis generally parallel to said axis of said first roll, and having an outer peripheral surface frictionally engaged by the moving web to impart rotation to said third roll, the flexible member engaging at least a circumferential portion of said third roll peripheral surface and being drawn into a nip formed between said third roll peripheral surface and the moving web.

9. Apparatus in accordance with claim 8 further comprising means for transmitting rotational motion imparted to said third roll by the moving web, to said first roll.

10. Apparatus in accordance with claim 9 wherein said transmitting means comprises:

(a) a first shaft rigidly carrying said first roll and being coaxial with said first axis, said first shaft having an end remote from said first roll rigidly carrying a sprocket wheel;

(b) a second shaft rigidly carrying said third roll and being coaxial with said axis about which said third roll rotates;

(c) a jack shaft geared to said second shaft for inverse rotation relative thereto, said jack shaft rigidly carrying a sprocket wheel axially coextensive with said sprocket wheel carried by said first shaft; and (d) chain means extending around both of said sprocket wheels;

(e) whereby, as the moving web moves by said third roll in engagement therewith, said first roll is caused to rotate in a direction opposite that in which said third roll rotates.

11. Apparatus for applying and bonding a string coated with a thermoplastic adhesive to a moving substrate, comprising:

(a) a first roll having a longitudinal axis and being disposed for rotation about said axis;

(b) a second roll having a longitudinal axis and being disposed for rotation about said axis of said second roll, said second roll being at least partially axially coextensive with said first roll and pivotable about a point so its axis defines a plane generally parallel to said axis of said first roll;

(c) a casting encircling an axial portion of at least one of said first and second rolls, said casting having a plurality of heating elements embedded therein;

(d) a third roll having a longitudinal axis and being disposed for rotation about said axis, the axis of said third roll being generally parallel to the axis of said first roll and having an outer peripheral surface frictionally engaged by the moving substrate to define a nip therebetween; and (e) means for transmitting rotational motion of said third roll to said first roll;

(f) wherein the string is coiled successively about said first and second rolls a sufficient number of times to absorb heat from said roll, so that, as said second roll is pivoted so that the angle between said axes in said plane is increased in size, adjacent coils of the string passing about said rolls are spaced axially along said rolls so that they do not engage one another, said roll having an axial portion of which said casting encircles, in order to raise the temperature of the adhesive to a level at which satisfactory bonding of the string to the substrate will occur, and wherein, thereafter, the string is directed into said nip and into engagement with the substrate.

12. A method of extending the period of time during which an elongated flexible member coated with a thermoplastic adhesive is in engagement with a heating roll, comprising the steps of:

(a) providing a second roll having an axis spaced from the axis of the heating roll;

(b) successively coiling the flexible member about both rolls; and (c) spacing said coils axially along said rolls so that they do not engage one another by pivoting said second roll with its axis moving in a plane generally parallel to said axis of said heating roll to a position at which said axes are out of parallel alignment so that the angle between said axes in said plane is increased in size.

* * * * *